April 2, 1957     V. W. FLORIO     2,787,395
BABY'S FEEDING AID
Filed March 29, 1955
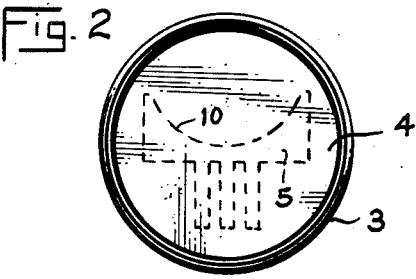
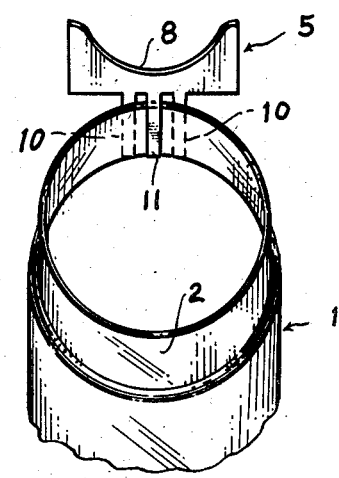
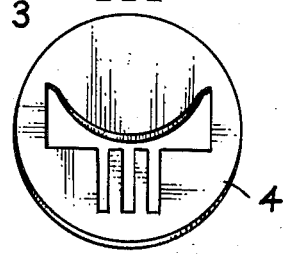
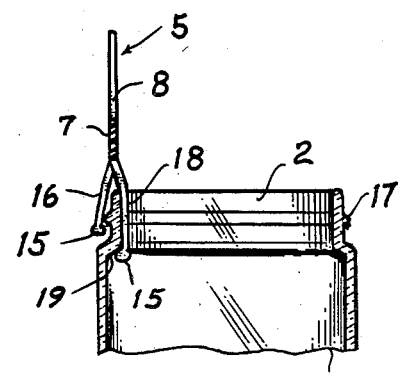
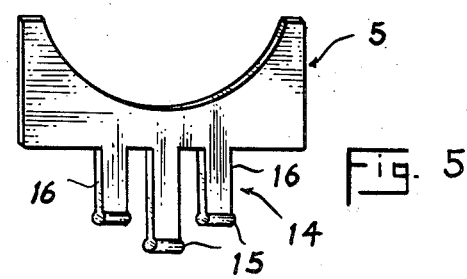
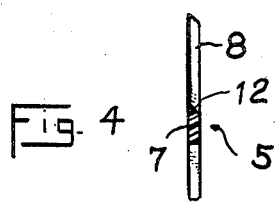
INVENTOR.
VITO W. FLORIO
BY
ATTORNEY

United States Patent Office 2,787,395
Patented Apr. 2, 1957

2,787,395

BABY'S FEEDING AID

Vito W. Florio, Bellport, N. Y.

Application March 29, 1955, Serial No. 497,545

3 Claims. (Cl. 215—100)

This invention relates to new and useful improvements in feeding aid devices. It particularly concerns means that may be used for wiping the bottom of the bowl of a spoon free of clinging matter.

The invention finds special use as an aid in cleaning the bottom of a spoon that is being used with baby foods, and it finds use particularly in association with jars conventionally containing such foods.

A feature of the invention is the adaptability of the device for attachment to the rim of a baby food jar, whereon it serves as a means over which the bottom of a spoon, previously dipped into the jar, may be wiped clean of any food clinging thereon. Such food, if not cleaned from the spoon, would ordinarily drop off and onto the clothing of the baby as the spoon is inserted into the child's mouth.

A further feature of the invention is an arrangement whereby the cleaning element is formed as a unitary part of a seal for the cap of the jar, the cleaning element being die-cut in the seal. The seal may be removed from the cap, and the cleaning element may be pressed out and mounted to the rim of the jar. By this arrangement, not only is a seal provided for the cap of the jar, but there is also provided a practical and inexpensive means for cleaning the bottom of the spoon after the latter is used in scooping some of the contents from the jar.

The device may be made of plastics, or other economical material suitable for the purposes intended. The inexpensive nature of a device embodying the invention permits a single use thereof, so that it may be subsequently thrown away. This is a sanitary advantage accruing to the benefit of the user.

A general object of this invention is, therefore, means that has economical, practical, and sanitary advantages as an aid in cleaning the bottom of a spoon, particularly a baby's spoon, of food clinging thereto during a feeding operation.

Another object of the invention is to provide an article that is attachable to a jar from which a small child is being fed, and which serves as a means for keeping clean the bottom of the child's spoon.

A still further object of the invention is to provide a device including a die-cut member that has a two-fold use, an initial use as a seal for the cap of a baby food jar, and a subsequent use for the die-cut member as a means for cleaning the bottom of a child's spoon free of food during a feeding operation.

The invention further lies in its particular construction, in the arrangement of its elements, and in its particular combinations and associations to effect the purposes intended.

The foregoing and other objects and advantages of this invention will appear more fully hereinafter from a consideration of the detailed description which follows, taken together with the accompanying drawings, wherein an embodiment of the invention is illustrated. It is to be expressly understood, however, that the drawings are for purposes of illustration and description, and are not to be construed as defining the limits of the invention.

In the drawings:

Fig. 1 is a view illustrating the spoon cleaning element in association with a conventional baby food jar;

Fig. 2 is a bottom plan view of the cap of the jar containing the seal element;

Fig. 3 is a detail of the cleaning element and seal, the former pressed out of the latter;

Fig. 4 shows a variation in the nature of the edge of the cradle portion of the cleaning element;

Fig. 5 is a perspective view of a modified form of the invention; and

Fig. 6 illustrates this modified form as mounted astride the rim of a jar.

In discussing the invention in further detail reference is directed to the several drawings, now particularly to Figs. 1–3, wherein there is shown a conventional baby food jar or container 1 having a neck 2 which accommodates a suitable covering cap 3. In the recess of the cap is a disc 4 which may be readily removed, or dropped out of the cap by holding the latter bottom end down. The disc suitably serves as a seal for the cap when the latter covers the jar. When the contents of the jar is being fed to a child, then the disc serves a further purpose, which will soon become apparent as this description proceeds. The disc is flat surfaced, and is relatively thin, desirably about three thirty-seconds of an inch, though it might be made thinner or thicker. It is, however, formed of firm material, suitable for the purposes intended thereof, preferably of resilient plastic, though it could also be formed of cardboard, or the like.

The disc has die-cut therein a spoon cleaning or wiping element 5, as indicated by the die-cut lines 6. The element 5 may be readily pressed out of the disc seal, and is adapted to be mounted in a vertical position to the uncovered rim of the jar 1. Element 5 has a body portion 7 which has in its uppermost end a concaved or cradle form edge 8 that conforms to the transverse shape of the widest part of the bottom of a small spoon, such as a teaspoon.

The wiping element 5 is supported in a vertical position astride the rim of the jar (Fig. 1) by suitable fastening means, which here assumes the form of a plurality of elongated legs 9, unitary at one end with the body portion and extending from the bottom end of the latter.

It is to be noted that the plastic of which the disc is formed has resilient qualities. Because of this the legs can be moved angularly froward or backward from their normal vertical position and, when released, will spring back to normal vertical position. In mounting the element 5 to the rim of the jar 1, the legs are angularly drawn and caused to straddle the rim, preferably so that the end legs 10 depend down along one face of the jar and the center leg 11 depends down the opposite face. The resilient quality of the legs causes them, in the manner of a spring clamp, to press upon and to grip against the opposed faces of the jar. This secures the element 5 in a vertical position relative to the rim of the jar wherein the cradle edge 8 of the device is uppermost.

In the use of the device, subsequent to each time a spoon is dipped into the jar to scoop out some of its contents, whatever adheres to the bottom of the bowl of the spoon is wiped off by drawing the bottom of the bowl across the edge of the cradle of the wiping element. The spoon is drawn in a direction away from the jar, so that matter wiped off the bowl of the spoon will drop back into the mouth of the jar.

The edge of the cradle of the wiping may be formed at a slight angle, as at 12 in Fig. 4, so that the edge will slope downward toward the mouth of the jar when the wiping element is mounted to the latter. This form of the cradle edge affords a greater wiping contact surface to the bottom of the spoon, and also tends to aid in sliding the removed matter back into the jar.

While the wiping element 5 has been shown as a die-cut part of the disc seal, and as an integral part thereof until pressed out, it is understood that the wiping element may be formed independently and apart from the seal, as indicated by the modified form shown in Figs. 5 and 6.

In this modified form, the legs 14 are provided with projections or beads 15 extending from opposite faces of the legs at the ends thereof. The end legs 16, which are intended to contact the outer face of the jar, are of a length sufficient to position the beaded ends thereof beneath a conventional peripheral thread 17 formed about the surface of the neck of the jar. The center leg, 18, is of a length sufficient to position the beaded end thereof beneath the bend or shoulder 19 formed on the inside of the jar at the base of the neck. In this construction, because of the resilient nature of the legs, the beaded ends of the legs snap respectively beneath the thread and bend of the neck, and thereby further anchor the wiping element astride the rim of the jar.

It is understood that the number of legs provided for the wiping element may be varied.

Besides the desirable resilient and clamping qualities enabled by forming the wiping element of plastic material, there are other advantages provided. Plastics are non-absorbent, and do not have to be specially treated, as would be required of paperboard or other absorbent material. Plastics come in a variety of attractive colors, which will not leach out or affect the contents of the jar, as might occur with other colored materials. The bright colors possible in plastics are also a boon to a mother in holding and quieting the attention of her child during a feeding operation employing the wiping element.

While the embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art; and it is my intention, therefore, to claim the invention not only as shown and described, but also in all such forms and modifications thereof as may reasonably be construed to be within the spirit of the invention and the scope of the appended claims.

What is claimed is:

1. In combination, an open mouthed jar; a cap for covering the jar; a removable firm disc seal member in the cap; and a spoon wiping element die-cut in the disc seal and characterized by a cradle edge in one end thereof over which the bottom of a spoon bowl may be drawn, and by means for supporting the wiping element vertically to the rim of the jar with the cradle edge of the latter uppermost.

2. In the combination as in claim 1, wherein the supporting means comprise a plurality of resilient leg elements extending from the opposite end of the wiping element and adapted to clamp vertically over the rim of the jar.

3. In the combination as the claim 1, wherein the surface of the cradle edge slopes in a lateral direction.

References Cited in the file of this patent

UNITED STATES PATENTS

| Number | Name | Date |
|---|---|---|
| 334,981 | Rampe | Jan. 26, 1886 |
| 1,017,753 | Harrison | Feb. 20, 1912 |
| 1,749,658 | Ault | Mar. 4, 1930 |
| 2,124,929 | Reid | July 26, 1938 |
| 2,186,071 | Hornecker | Jan. 9, 1940 |
| 2,192,526 | Rosenberger | Mar. 5, 1940 |